(12) United States Patent
van Nieuwstadt et al.

(10) Patent No.: US 6,286,532 B1
(45) Date of Patent: Sep. 11, 2001

(54) CONTROL SYSTEM AND METHOD FOR CONTROLLING VALVE

(75) Inventors: Michiel Jacques van Nieuwstadt, Ann Arbor; Fazal Urrahman Syed, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/570,508

(22) Filed: May 13, 2000

(51) Int. Cl.$^7$ .................................................. F16K 31/02
(52) U.S. Cl. .......................................... 137/1; 251/129.04
(58) Field of Search ............................. 137/1; 251/129.04

(56) References Cited

U.S. PATENT DOCUMENTS

| | | |
|---|---|---|
| 5,771,000 | 6/1999 | Matsumoto et al. . |
| 5,992,383 | * 11/1999 | Scholten ...................... 251/129.04 X |
| 6,044,857 | * 4/2000 | Stege ........................... 251/129.04 X |
| 6,148,837 | * 11/2000 | Irokawa et al. ............. 251/129.04 X |

FOREIGN PATENT DOCUMENTS

0495295A2    7/1992   (EP) .

* cited by examiner

*Primary Examiner*—Kevin Lee
(74) *Attorney, Agent, or Firm*—John F. Buckert; William J. Coughlin

(57) ABSTRACT

A control system 10 and a method 30 for controlling a linearly actuated valve closure member 20 in accordance with the present invention is provided. The method 30 includes a step 32 of determining a control value associated with a control signal indicative of an uncompensated target position of the closure member 20. The method 30 further includes a step 52 of calculating a friction compensation value associated with the closure member 20. The friction compensation value may comprise a static friction compensation value or a coulombic friction compensation value. The method 30 further includes a step 104 of calculating a compensating control value responsive to the control value and the friction compensation value. The method 30 further includes a step 108 of actuating the closure member 20 responsive to the compensating control value.

24 Claims, 8 Drawing Sheets

Set the static friction compensation value SF equal to zero when the closure member is moving — 44

FIG. 4C

High pass filter the control signal $V_C$ to obtain a directional value D associated with high frequency components of the control signal $V_C$ — 46

Compare the directional value D to a directional calibration constant $D_{C1}$ to determine whether the control signal $V_C$ is directing the closure member to move in a first direction — 48

Determine the static friction compensation value SF responsive to whether the control signal $V_C$ is directing the closure member to move in the first direction — 50

FIG. 4D

Set the static friction compensation value SF equal to a static friction calibration constant $SF_{C1}$ when the control signal $V_C$ is directing the closure member to move in the first direction — 54

FIG. 4E

Compare the directional value D to a directional calibration constant $D_{C2}$ to determine whether the control signal $V_C$ is directing the closure member to move in a second direction — 56

Determine the static friction compensation value SF responsive to whether the control signal $V_C$ is directing the closure member to move in the second direction — 58

FIG. 4F

Set the static friction compensation value SF equal to a static friction calibration constant $SF_{C2}$ when the control signal $V_C$ is directing the closure member to move in the second direction — 60

FIG. 4G

Set the static friction compensation value SF equal to zero when the control signal $V_C$ is not directing the closure member to move in the second direction — 62

FIG. 4H

High pass filter the control signal $V_C$ to obtain a directional value D associated with high frequency components of the control signal $V_C$ — 64

Compare the directional value D to a directional calibration constant $D_{C1}$ to determine whether the control signal $V_C$ is directing the closure member to move in a first direction — 66

Determine the coulombic friction compensation value CF responsive to whether the control signal $V_C$ is directing the closure member to move in the first direction — 68

FIG. 4I

Set the coulombic friction compensation value CF equal to a coulombic friction calibration constant $CF_{C1}$ when the control signal $V_C$ is directing the closure member to move in the first direction — 70

FIG. 4J

CONTROL SYSTEM AND METHOD FOR CONTROLLING VALVE

FIELD OF THE INVENTION

This invention relates to a control system and a method for controlling a valve. In particular, the invention relates to a control system and a method that compensates for hysteresis in the valve caused by coulombic friction and static friction.

BACKGROUND OF THE INVENTION

Valves have long been used to control the flow of gases and/or fluids through conduits. In particular, EGR valves have been used to control the amount of recirculated exhaust gas in an automotive engine to thereby reduce the level of nitric oxides Nox) in the exhaust gas. A relatively fast EGR valve response is necessary to maintain low emission levels during transient operation of the engine. EGR valves and valves in general frequently exhibit severe hysteresis impeding a rapid valve response. The hysteresis in a valve may be caused by (i) the paramagnetic behavior of an electrically actuated valve, (ii) dead travel time for a pneumatically actuated valve, and (iii) soot deposits impeding the motion of a closure member within the valve. Regardless of the specific cause of the hysteresis, the hysteresis includes two types of friction: static friction and coulombic friction.

The static friction force (hereinafter referred to as static friction) acts to impede the initial motion of a valve closure member within the valve. Referring to FIG. 1, a diagram illustrating the static friction is provided. The static friction is at a maximum value when the valve closure member is not moving. Once the valve closure member begins moving in either a first direction or a second direction, the static friction is no longer present.

The coulombic friction force (hereinafter referred to as coulombic friction) acts to impede the motion of a valve closure member whenever the closure member is moving.

Referring to FIG. 2, a diagram illustrating coulombic friction is provided. The coulombic friction has a constant amplitude whose sign is dependent on the direction of the velocity of the closure member.

One known throttle valve control system is utilized to control a rotatable throttle valve. The control system includes a control means that increases the effort supplied to the throttle valve when the valve closure member approaches a closed position. A first problem associated with the known control system is that the system only compensates for static friction and friction when the closure member approaches a closed position. Accordingly, when the closure member is at an operational position that is not near the closed position, the control system does not compensate for the static friction. A second problem with the known control system is that the control system does not compensate for coulombic friction. As a result, when the closure member is moving, the response time of the valve may be increased due to the coulombic friction.

There is thus a need for a control system and a method for controlling a valve closure member that minimizes or reduces one of more of the above-mentioned deficiencies.

SUMMARY OF THE INVENTION

The present invention provides a control system and a method of controlling a valve closure member that compensates for hysteresis caused by static friction and/or coulombic friction. In particular, the control system and the method may be utilized to control any type of valve closure member including linearly actuated valve closure members and rotatably actuated valve closure members.

A method for controlling a valve closure member in accordance with the present invention includes the steps of determining a control value indicative of an uncompensated target position of the closure member. The method further includes the step of calculating a friction compensation value associated with the closure member. The friction compensation value may comprise a static friction compensation value or a coulombic friction compensation value. The friction compensation value may be used to increase or decrease a compensating control value and an associated compensating control signal to compensate for the static friction and/or coloumbic friction. The method further includes the step of calculating the compensating control value responsive to the control value and the friction compensation value. Finally, the method includes the step of actuating the closure member responsive to the compensating control value.

A control system for controlling a valve closure member in accordance with the present invention includes an actuator that variably controls a position of the closure member. The system further includes a controller configured to determine a control value indicative of an uncompensated target position of the closure member. The controller is further configured to calculate a friction compensation value associated with the closure member. The controller is further configured to calculate a compensating control value responsive to the control value and the friction compensation value. Finally, the controller is configured to actuate the closure member responsive to the compensating control value.

A control system and a method in accordance with the present invention represent a significant improvement over conventional systems and methods. In particular, the inventive control system and method compensates for hysteresis caused by static friction and/or coulombic friction resulting in a relatively fast valve response. Further, the inventive control system and method compensates for hysteresis over the entire operational position range of a valve closure member.

These and other features and advantages of this invention will become apparent to one skilled in the art from the following detailed description and the accompanying drawings illustrating features of this invention by way of example.

DETAILED DESCRIPTION OF THE PREFERRED EMBODIMENTS

Figure 1:
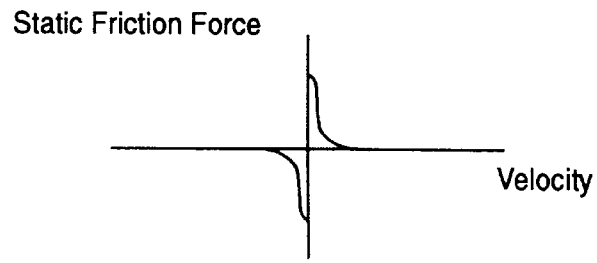
FIG. 1 is a diagram illustrating the relationship between a static friction force and a velocity of a valve closure member.
Figure 2:
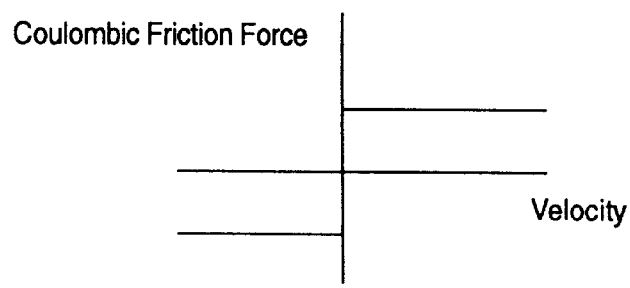
FIG. 2 is a diagram illustrating the relationship between a coulombic friction force and a velocity of a valve closure member.
Figure 3:
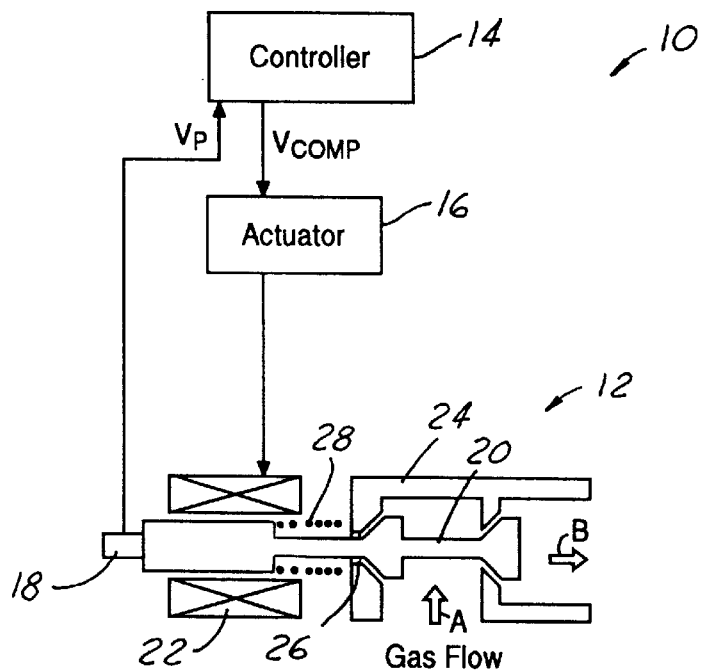
FIG. 3 is a combination schematic and block diagram showing a control system in accordance with the present invention connected to a linearly actuated valve.

Referring now to the drawings wherein like reference numerals are used to identify identical components and steps in the various views, FIG. 3 illustrates a control system 10 for controlling a valve such as a linearly actuated valve 12. Although the linearly actuated valve 12 is illustrated, it should be understood that the control system 10 may also be utilized with any conventional valve including a rotatably actuated valve such as a throttle valve. The control system includes a controller 14, an actuator 16, and a position sensor 18.

The valve 12 is provided to selectively control the amount of gas and/or fluid flow (hereinafter collectively referred to as gas flow) through the valve 12. The valve 12 is conventional in the art and includes a closure member 20, a coil 22, a sealing portion 24, a seal 26, and a spring 28.

When a level of current applied to the coil 22 does not induce a force on the closure member 20 greater than a spring force of the spring 28, the spring 28 urges the member 20 against the sealing portion 24. Accordingly, gas does not flow through the valve 12. Alternately, when a level of current applied to the coil 22 does induce a force on the member 20 greater than the spring force of the spring 28, the member 20 moves linearly in a first direction (to the right of FIG. 3). As a result, gas flow may result in a direction indicated by the arrows A and B. Further, the seal 26 prevents the gas from escaping past the sealing portion 24. The distance the closure member 20 moves in a first direction or a second direction opposite the first direction, may be controlled by controlling the level of current applied to the coil 22. Accordingly, the amount of gas flow through the valve 12 may be controlled by controlling the level of current applied to the coil 22.

The position sensor 18 generates a position signal $V_P$, indicative of the position of the valve closure member 20. The sensor 18 is conventional in the art and may comprise a linear potentiometer. The sensor 18 may have a tap component (not shown) that is connected to the closure member 20. Accordingly, the sensor 18 generates a voltage proportional to the linear position of the tap component and correspondingly proportional to the linear position of the member 20. The position sensor 18 is electrically connected to the controller 14 and transmits the position signal $V_P$ to the controller 14.

The controller 14 is provided to selectively control the position of the valve closure member 20. The controller 14 may be conventional in the art and include a read-only memory (ROM) for storing software algorithms implementing the inventive methods described hereinbelow. As illustrated, controller 14 is electrically connected to the actuator 16 and the position sensor 18 and receives the position signal $V_P$, from the sensor 18. The controller 14 may calculate a plurality of control values C corresponding to a control signal $V_C$—indicative of an uncompensated target position of the member 20—based upon various engine operational parameters. For example, the control signal $V_C$ may be calculated based upon a manifold pressure, a manifold mass air flow, or a manifold temperature of an automotive engine. In an alternate embodiment, the controller 14 may receive the control signal $V_C$ from an external controller (not shown). The controller 14 may sample the control signal Vc and derive a control value C from the signal $V_C$. Referring to FIG. 3 in the illustrated embodiment, the controller 14 generates a compensating control signal $V_{COMP}$ to control the valve closure member 20 responsive to the control signal $V_C$ (not shown in FIG. 3) and the position signal $V_P$.

The actuator 16 is provided to control the level of current applied to the coil 22 of the valve 12 responsive to the compensating control signal $V_{COMP}$. The actuator 16 is conventional in the art and may comprise a current driver. As illustrated, the actuator 16 is electrically connected between the controller 14 and the coil 22.

Figure 4A:
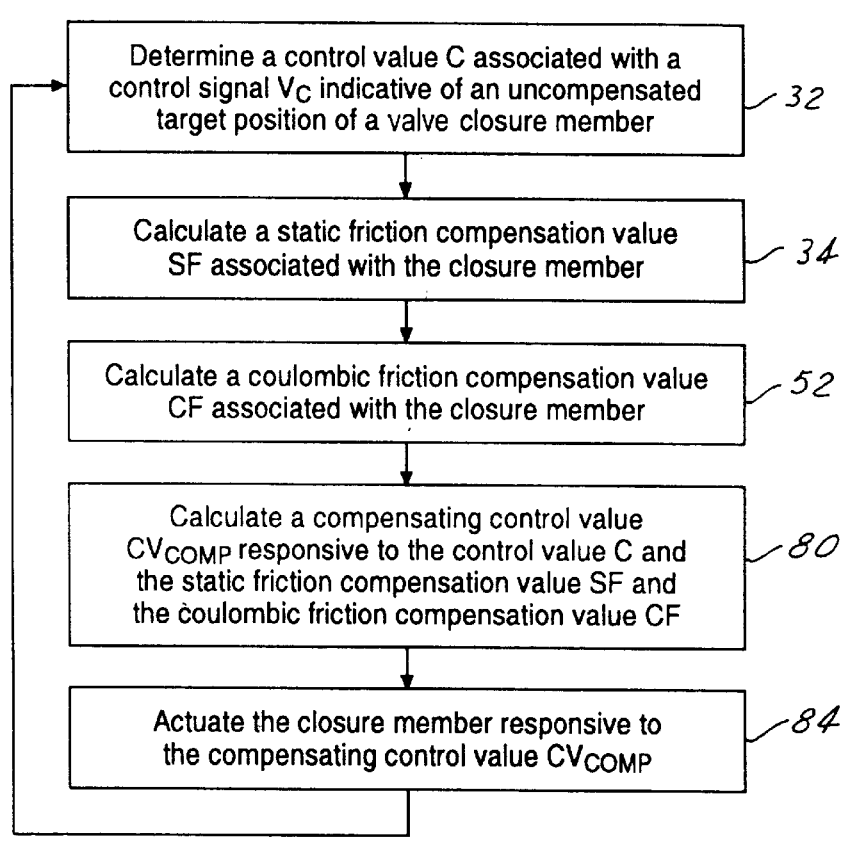
FIGS. 4A–O are flowcharts showing a method for controlling a valve closure member in accordance with a first embodiment of the present invention.

Referring to FIG. 4A, a method 30 for controlling a linearly actuated valve closure member 20 in accordance with a first embodiment of the present invention is illustrated. It should be understood, however, that the method 30 may be utilized with any conventional valve including a rotatably actuated valve such as a throttle valve. The method 30 may be implemented using software algorithms stored in the ROM of the controller 14 or may be implemented using discrete solid-state components. The method 30 includes a step 32 of determining a control value C indicative of an uncompensated target position of the member 20. The step 32 may include a substep of calculating the control value C responsive to one or more measured engine operational parameters. In particular, the control value C may be calculated utilizing the formula:

$$C=CFF+Kp*(MAF-MAF_{DES})+Ki\partial(MAF-MAF_{DES})dt$$

where
CFF=feedforward term calculated using a measured RPM and a fueling level of an engine (not shown)
MAF=mass air flow through an intake manifold of an engine
$MAF_{DES}$=desired mass air flow
Ki=integration gain
Kp=proportional gain
In an alternate embodiment, the step 32 may include the substeps of sampling a control signal $V_C$ received by the controller 14 and deriving the control value C from the control signal $V_C$.

Figure 4B:
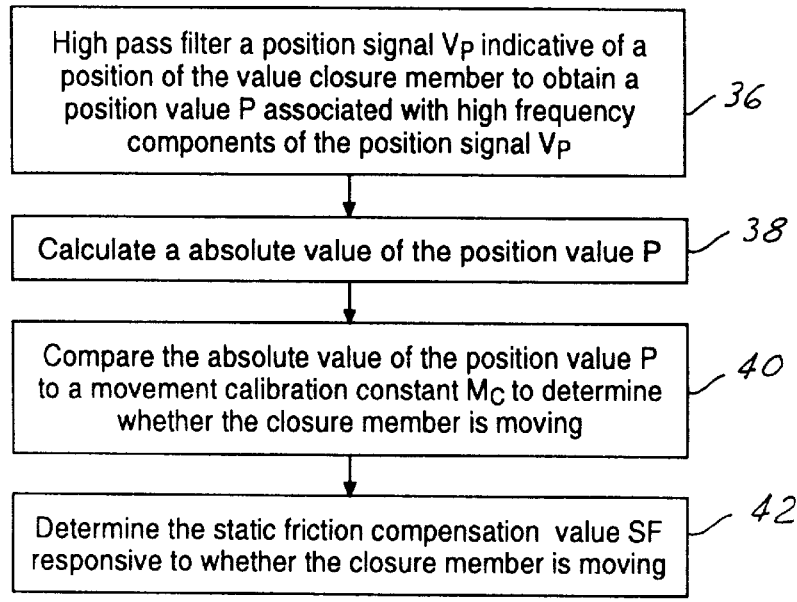

The method 30 further includes a step 34 of calculating a static friction compensation value SF associated with the closure member 20. The static friction compensation value SF is used to increase or decrease the compensating control signal $V_{COMP}$ to compensate for the static friction induced on closure member 20. As previously discussed, the static friction is present only when the member 20 is not moving. The step 34 may be implemented using discrete solid state components or may be implemented utilizing software algorithms stored in the ROM of the controller 14. Referring to FIG. 4B, the step 34 may include the substeps 36, 38, 40, and 42.

The substep 36 high pass filters the position signal $V_P$ to obtain a position value P associated with high frequency components of the position signal $V_P$. The substep 36 may include a substep of determining a low pass signal $P_L$ utilizing the first transfer function $$P_L=V_P/(tc_1s+1)$$

where
$tc_1$=filter time constant
s=complex variable

The filter time constant tc is readily determined by one skilled in the art based upon the desired response time of the valve closure member 20 and the frequency of the signal noise associated with the signal $V_P$. The substep 36 may further include the substep of calculating the position value P corresponding to the high frequency components of the position signal $V_P$ using the following formula: $P=V_P-P_L$. As indicated by the foregoing formula, the high frequency components of the position signal $V_P$ are obtained by subtracting the low frequency components of the position signal $V_P$ from the position signal $V_P$ It should be understood that the first transfer function may be implemented in software utilizing an infinite impulse response (IIR) filter algorithm or a finite impulse response (FIR) filter algorithm.

The substep 38 following the substep 36 calculates an absolute value of the position value P.

The substep 40 following the substep 38 may compare the absolute value of the position value P to a movement calibration constant $M_C$ to determine whether the closure member is moving. In particular, if the absolute value of the position value P is greater than the movement calibration constant $M_C$, the member 20 is moving. Alternately, if the position value P is less than or equal to the movement calibration constant $M_C$, the member 20 is not moving. The constant $M_C$ may be empirically determined by one skilled in the art and is dependent on the desired response time of the member 20 and the frequency of the signal noise associated with the position signal $V_P$.

The substep 42 following the substep 40 determines the static friction compensation value SF responsive to whether the closure member 20 is moving. Referring to FIGS. 4C and 4D, the substep 42 includes the substeps 44, 46, 48 and 50.

Referring to FIGS. 4C and 4D, if the closure member 20 is moving, the method 30 advances to the substep 44 that sets the static friction compensation value SF equal to zero. In other words, when the closure member 20 is moving, the static friction induced on the closure member 20 is negligible and therefore no compensation is needed to overcome the static friction. Alternately, if the member 20 is not moving, the method 30 advances sequentially through the substeps 46, 48, and 50.

Referring to FIG. 4D, the substep 46 high pass filters the control signal $V_C$ to obtain a directional value D associated with high frequency components of the control signal $V_C$. The substep 46 may include a substep of determining a low pass signal DL utilizing the second general transfer function $$D_L = V_C/(tc_2s+1)$$

where tc$_2$=filter time constant s=complex variable

The filter time constant tc$_2$ is readily determined by one skilled in the art and is dependent on the desired response time of the valve closure member 20 and the frequency of the signal noise associated with the signal $V_C$ The substep 46 may further include a substep of determining the directional value D corresponding to the high frequency components of the control signal $V_C$ using the following formula: $D=V_C-D_L$. As indicated by the foregoing formula, the high frequency components of the control signal $V_C$ may be obtained by subtracting the low frequency components of the control signal $V_C$ from the control signal $V_C$ It should be understood that the second transfer function may be implemented in software utilizing an IIR filter algorithm or a FIR filter algorithm.

The substep 48 following the substep 46 compares the directional value D to a directional calibration constant $D_{C1}$ to determine whether the control signal $V_C$ is directing the closure member 20 to move in a first direction (to the right in FIG. 3). In particular, if the directional value D is greater than the directional calibration constant $D_{C1}$ which is a positive value, the control signal $V_C$ is directing the member 20 to move in the first direction. Alternately, if the directional value D is less than or equal to the directional calibration constant $D_{C1}$, the control signal $V_C$ is not directing the member 20 to move in the first direction. The directional calibration constant $D_{C1}$ may be empirically determined by one skilled in the art and is dependent on the desired response time of the member 20 and the frequency of the signal noise associated with the control signal $V_C$.

The substep 50 following the substep 48 determines the static friction compensation value SF responsive to whether the control signal $V_C$ is directing the closure member 20 to move in the first direction. Referring to FIGS. 4E and 4F, the substep 50 includes the substeps 54, 56, and 58.

If the control signal $V_C$ is directing the closure member 20 to move in the first direction, the method 30 advances to the substep 54. The substep 54 sets the static friction compensation value SF equal to a static friction calibration constant $SF_{C1}$. The constant $SF_{C1}$ is a positive value corresponding to compensation in the first direction. In other words, when the control signal $V_C$ is directing the closure member 20 to move in the first direction and the member 20 is not moving, the constant $SF_{C1}$, is utilized to increase the compensating control signal $V_{COMP}$ to compensate for the static friction. The constant $SFC_1$ may be empirically determined by one skilled in the art and is dependent on desired response time of the member 20 and the frequency of the signal noise associated with the control signal $V_C$. Alternately, if the control signal $V_C$ is not directing the member 20 to move in the first direction, the method 30 advances sequentially through the substeps 56 and 58.

The substep 56 compares the directional value D to a directional calibration constant $D_{C2}$ to determine whether the control signal $V_C$ is directing the closure member 20 to move a second direction (to the left in FIG. 3). In particular, if the directional value D is less than the directional calibration constant $D_{C2}$ which is a negative value, the control signal $V_C$ is directing the member 20 to move in the second direction. Alternately, if the directional value D is greater than or equal to the directional calibration constant $D_{C2}$, the control signal $V_C$ is not directing the member 20 to move in the second direction. The directional calibration constant $D_{C2}$ may be empirically determined by one skilled in the art and is dependent on the desired response time of the member 20 and the frequency of the signal noise associated with the control signal $V_C$. In a constructed embodiment, the directional calibration constant $D_{C2}$ is the negative value of the directional calibration constant $D_{C1}$ ($D_{C2}=-D_{C1}$).

The substep 58 following the substep 56 determines the static friction compensation value SF responsive to whether the control signal $V_C$ is directing the closure member 20 to move in the second direction (to the left in FIG. 3). Referring to FIGS. 4G and 4H, the substep 58 includes the substeps 60 and 62.

If the control signal $V_C$ is directing the closure member 20 to move in the second direction, the method 30 advances to the substep 60. The substep 60 sets the static friction compensation value SF equal to a static friction calibration constant $SF_{C2}$ which is a negative value corresponding to compensation in the second direction. In other words, if the control signal $V_C$ is directing the closure member 20 to move in the second direction when the member 20 is not moving, the constant $SF_{C2}$ is utilized to decrease the compensating control signal $V_{COMP}$ to compensate for the static friction. The constant $SF_{C2}$ may be empirically determined by one skilled in the art and is dependent on the desired response time of the member 20 and the frequency of the signal noise associated with the control signal $V_C$. Alternately, if the control signal $V_C$ is not directing the member 20 to move in the second direction (or the first direction), the method 30 advances to the substep 62. The substep 62 sets the static friction compensation value SF equal to zero. In other words, if the control signal $V_C$ is not directing the member 20 to move in either the first or second direction, then no additional compensation for static friction is required. Upon completion of either the substep 60 or the substep 62, the method 30 advances to the step 52.

Referring to FIG. 4A, the method 30 includes the step 52 following the step 34. It should be understood, however, that the step 52 could be performed prior to the step 34 in an alternate embodiment of the inventive method. The step 52 calculates a coulombic friction compensation value CF associated with the closure member 20. The coulombic friction compensation value CF is used to increase or decrease the compensating control signal $V_{COMP}$ to compensate for the coulombic friction induced on closure member 20. As previously discussed, the coulombic friction is only present when the member 20 is moving. The step 52 may be implemented using discrete solid state components or may be implemented utilizing algorithms stored in the ROM of the controller 14. Referring to FIG. 4I, the step 52 may include the substeps 64, 66, and 68.

The substep 64 high pass filters the control signal $V_C$ to obtain the directional value D associated with high frequency components of the control signal $V_C$. The substep 64 is identical to the previously discussed substep 46.

The substep 66 following the substep 64 compares the direction value D to the directional calibration constant $D_{C1}$ to determine whether the control signal $V_C$ is directing the closure member 20 to move in the first direction (to the right in FIG. 3). The substep 66 is identical to the previously discussed substep 48.

Figure 4K:
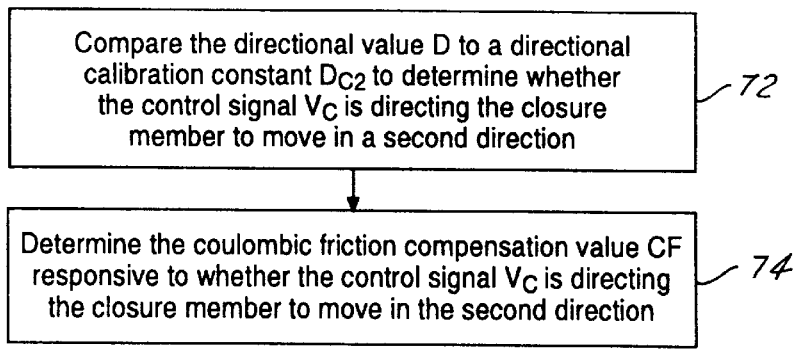

The substep 68 following the substep 66 determines the coulombic friction compensation value CF responsive to whether the control signal $V_C$ is directing the closure member 20 to move in the first direction. Referring to FIGS. 4J and 4K, the substep 68 includes the substeps 70, 72, and 74.

If the control signal $V_C$ is directing the closure member 20 to move in the first direction, the method 30 advances to the substep 70. The substep 70 sets the coulombic friction compensation value CF equal to a coulombic friction calibration constant $CF_{C1}$. The constant $CF_{C1}$ is a positive value corresponding to compensation in the first direction. In other words, if the control signal $V_C$ is directing the member 20 to move in the first direction, the constant $CF_{C1}$ is utilized to increase the compensating control signal $V_{COMP}$ to compensate for the coulombic friction. The constant $CF_{C1}$ may be empirically determined by one skilled in the art and is dependent on the desired response time of the member 20 and the frequency of the signal noise associated with the control signal $V_C$. Alternately, if the control signal $V_C$ is not directing the member 20 to move in the first direction, the method 30 advances sequentially through substeps 72 and 74.

The substep 72 compares the directional value D to a directional calibration constant $D_{C2}$ to determine whether the control signal $V_C$ is directing the closure member 20 to move in a second direction (to the left in FIG. 3). The substep 72 is identical to the previously discussed substep 56.

Figure 4L:
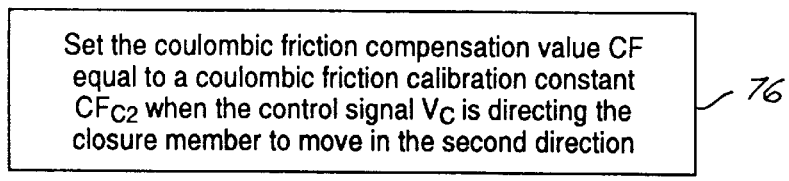
Figure 4M:
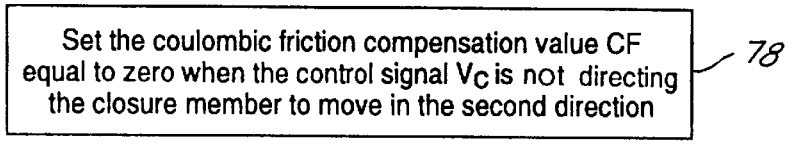

The substep 74 following the substep 72 determines the coulombic friction compensation value CF responsive to whether the control signal $V_C$ is directing the closure member 20 to move in the second direction. Referring to FIGS. 4L and 4M, the substep 74 includes the substeps 76 and 78.

If the control signal $V_C$ is directing the closure member 20 to move in the second direction, the substep 76 sets the coulombic friction compensation value CF equal to a coulombic friction calibration constant $CF_{C2}$. The constant $CF_{C1}$ is a negative value corresponding to compensation in the second direction. In other words, if the control signal $V_C$ is directing the member 20 to move in the second direction, the constant $CF_{C2}$ is utilized to decrease the compensating control signal $V_{COMP}$ to compensate for the coulombic friction. The constant $CF_{C2}$ may be empirically determined by one skilled in the art and is dependent on the desired response time of the member 20 and the frequency of the signal noise associated with the control signal $V_C$. Alternately, if the control signal $V_C$ is not directing the member 20 to move in the second direction (or the first direction), the substep 78 sets the coulombic friction compensation value CF equal to zero. In other words, if the control signal $V_C$ is not directing the member 20 to move in either the first or second direction, then no compensation for coulombic friction is required. Upon completion of either of the substeps 76 or 78, the method 30 advances to the step 80.

Figure 4N:
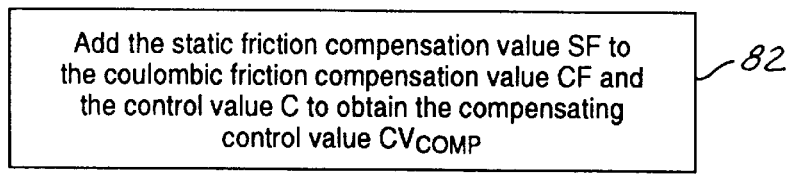

Referring to FIG. 4A, the method 30 further includes the step 80 following the step 52. The step 80 calculates the compensating control value $CV_{COMP}$ responsive to the control value C and the static friction compensation value SF and the coulombic friction compensation value CF. Referring to FIG. 4N, the step 80 includes the substep 82. The substep 82 adds the static friction compensation value SF to the coulombic friction value CF and the control value C to obtain the compensating control value $CV_{COMP}$ ($CV_{COMP}$=C+SF+CF).

Figure 4O:
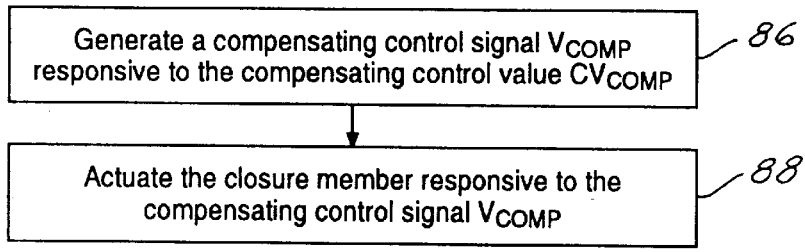

The method 30 further includes the step 84 following the step 80 that actuates the closure member 20 responsive to the compensating control value $CV_{COMP}$. Referring to FIG. 4O, the step 84 includes the substeps 86 and 88. The substep 86 generates a compensating control signal $VC_{COMP}$ responsive to the compensating control value $CV_{COMP}$. The substep 88 actuates the member 20 responsive to the signal $V_{COMP}$.

Figure 7A:
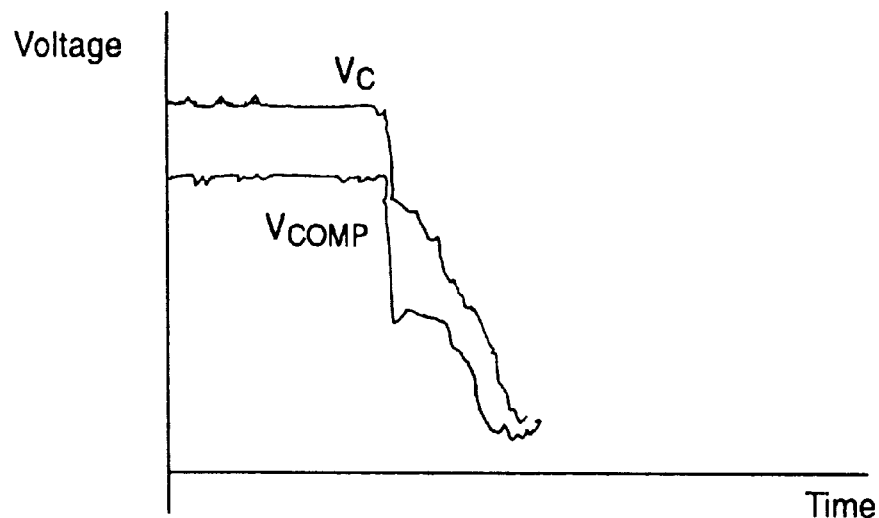
FIGS. 7A–B are diagrams showing uncompensated and compensated control signals and corresponding uncompensated and compensated position signals associated with a valve closure member.
Figure 7B:
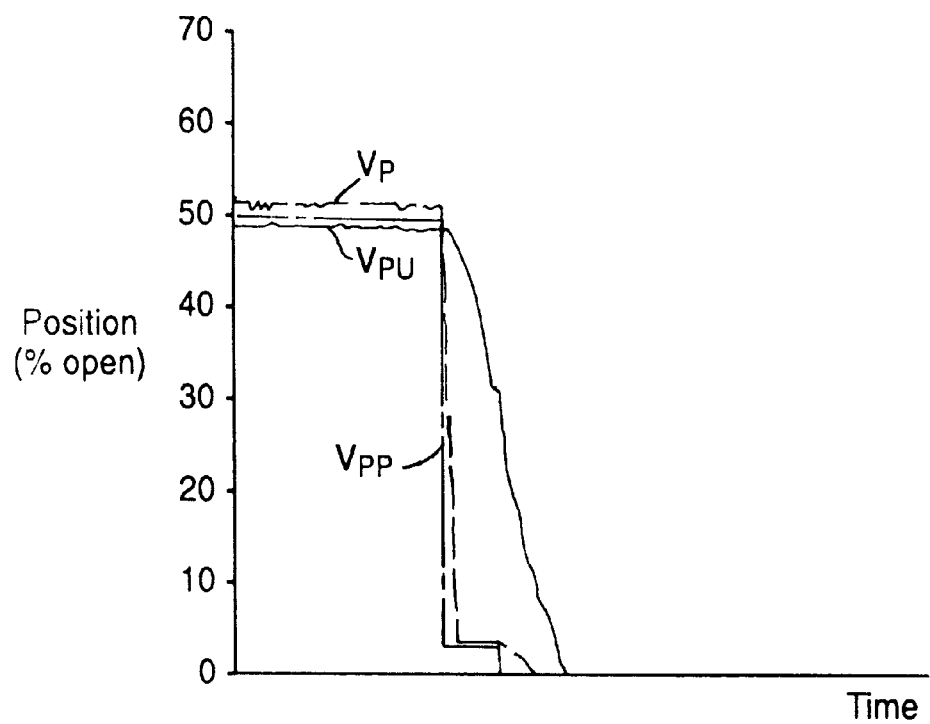

The improved system response of the control system 10 and the method 30 as compared with conventional control systems will be discussed. Referring to FIG. 7A, the control signal $V_C$ is illustrated. As previously discussed, the control signal $V_C$ corresponds to the uncompensated target position of the closure member 20. Accordingly, the control signal $V_C$ does not compensate for hysteresis caused by static friction or coulombic friction. Referring to FIG. 3, in a conventional uncompensated system (not shown), a controller generates the control signal $V_C$ that is applied directly to the actuator 16 to actuate the member 20. Referring to FIG. 7B, a position signal $V_{PU}$ is shown which is generated by the sensor 18 in response to the control signal $V_C$ being applied directly to the actuator 16. As illustrated, the position signal $V_{PU}$ corresponds to the member 20 moving from a 50% open position to a full-closed position.

Referring to FIG. 7A, the compensating control signal $V_{COMP}$ generated by the controller 14 of inventive control system 10 is shown. As previously discussed, the compensating control signal $V_{COMP}$ compensates for hysteresis caused by static friction and coulombic friction associated with the closure member 20. Referring to FIG. 7B, a position signal $V_P$ is shown that is generated by the sensor 18 responsive to the control signal $V_{COMP}$ being applied to the actuator 16. Further, a position signal $V_{PP}$ representing an ideal system response is shown. As illustrated, the position signal $V_P$ generated by the inventive control system 10 more accurately follows the ideal response—shown by the signal $V_{PP}$—than does the position signal $V_{PU}$. As illustrated, the control system 10 has a faster response time than the conventional control system that does not compensate for hysteresis caused by static friction and/or coulombic friction.

Figure 5A:
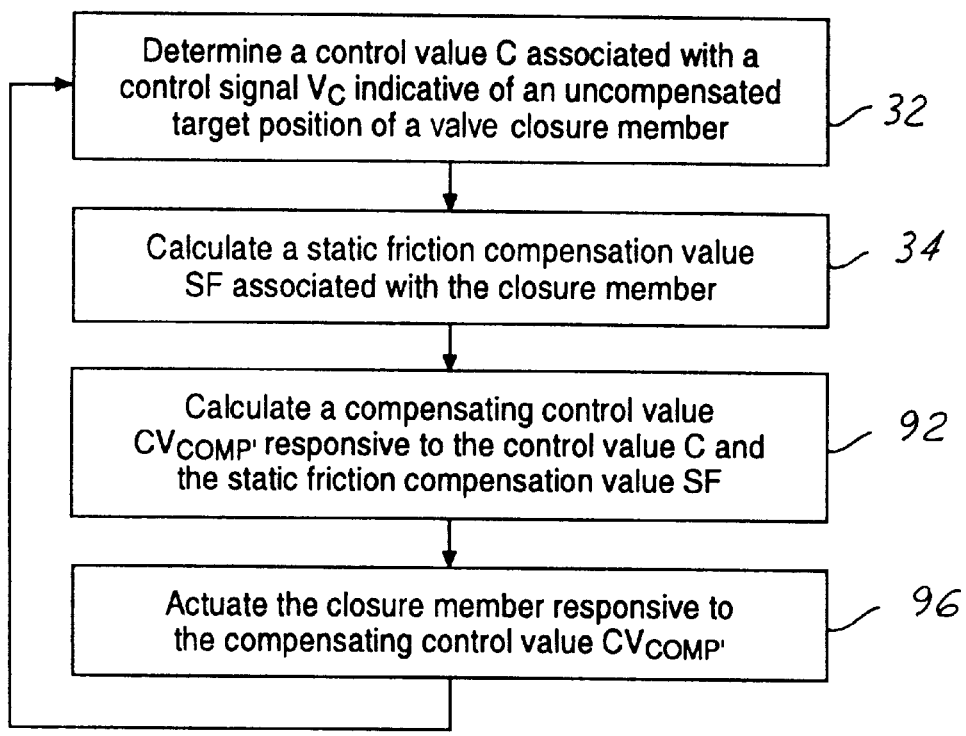
FIGS. 5A–C are flowcharts showing a method for controlling a valve closure member in accordance with a second embodiment of the present invention.
Figure 5B:
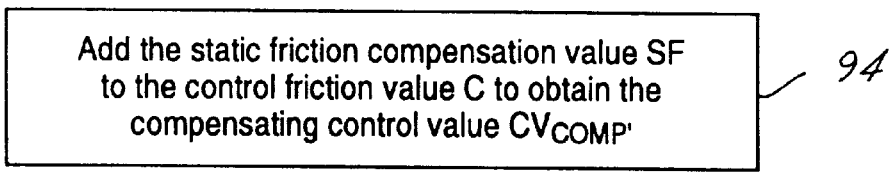
Figure 5C:
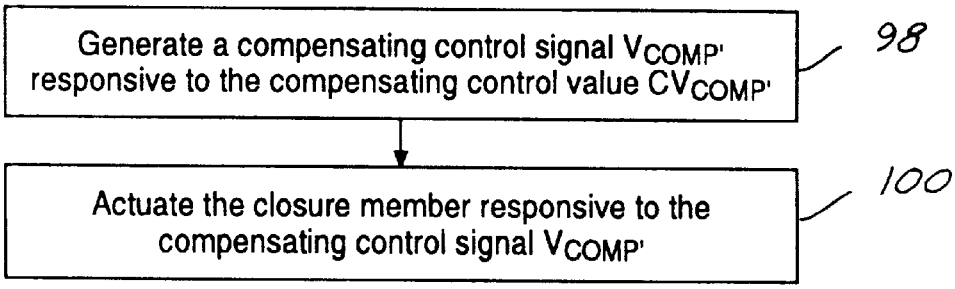

Referring to FIG. 5A, a method 90 for controlling a linearly actuated valve closure member 20 in accordance with a second embodiment of the present invention is illustrated. It should be understood, however, that the method 90 may be utilized with any conventional valve including a rotatably actuated valve such as a throttle valve. The method 90 compensates for static friction associated with the member 20. The method 90 includes the step 32 of determining the control value C associated with the control signal $V_C$ indicative of an uncompensated target position of the member 20. The method 90 further includes the step 34 of calculating the static friction compensation value SF associated with the member 20. The method 90 further includes a step 92 of calculating a compensating control value $CV_{COMP'}$ responsive to the control value C and the static friction compensation value SF. Referring to FIG. 5B, the step 92 includes a substep 94 of adding the static friction compensation value SF to the control value C to obtain the compensating control value $CV_{COMP'}$ ($CV_{COMP'}=C+SF$). Referring to FIG. 5A, the method 90 further includes a step 96 of actuating the member 20 responsive to the compensating control value $CV_{COMP'}$. Referring to FIG. 5C, the step 96 includes a substep 98 of generating a compensating control signal $V_{COMP'}$ responsive to the compensating control value $CV_{COMP'}$. The step 96 further includes a substep 100 of actuating the member 20 responsive to the compensating control signal $V_{COMP'}$.

Figure 6A:
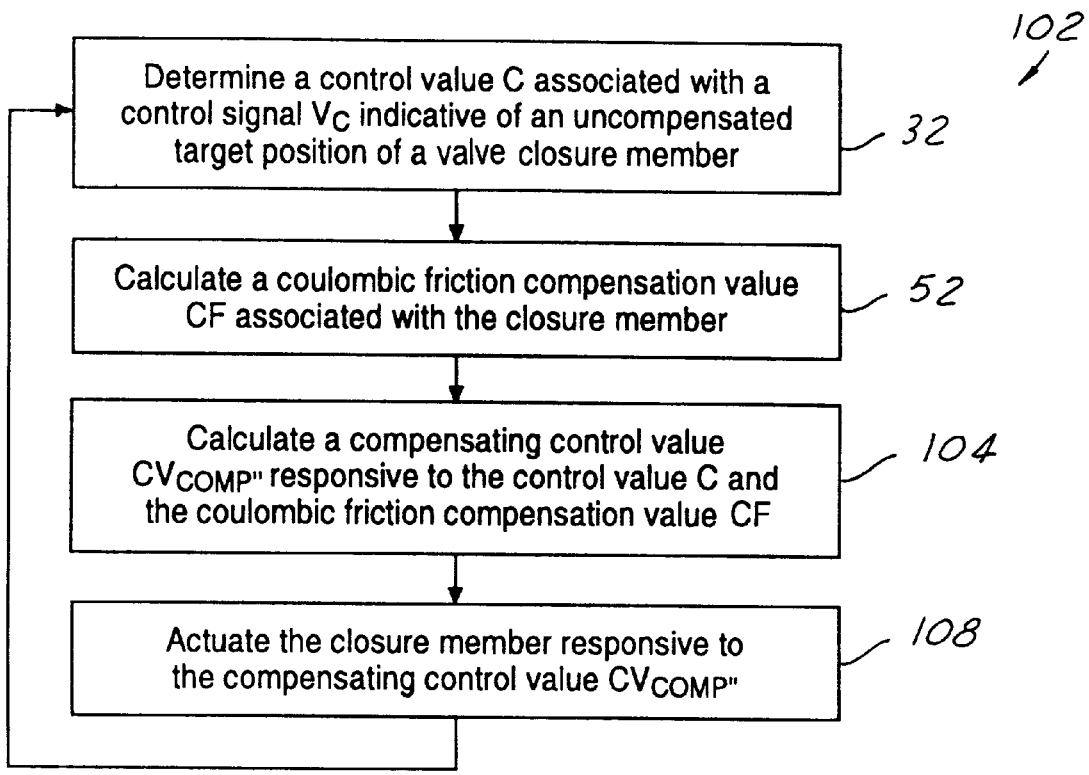
FIGS. 6A–C are flowcharts showing a method for controlling a valve closure member in accordance with a third embodiment of the present invention.
Figure 6B:
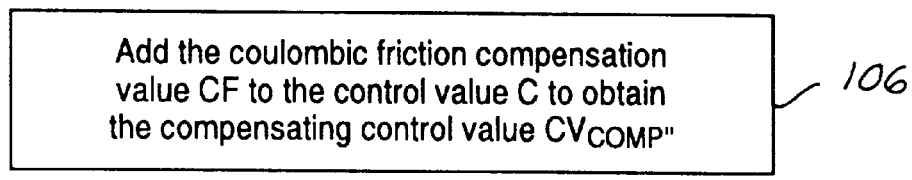
Figure 6C:
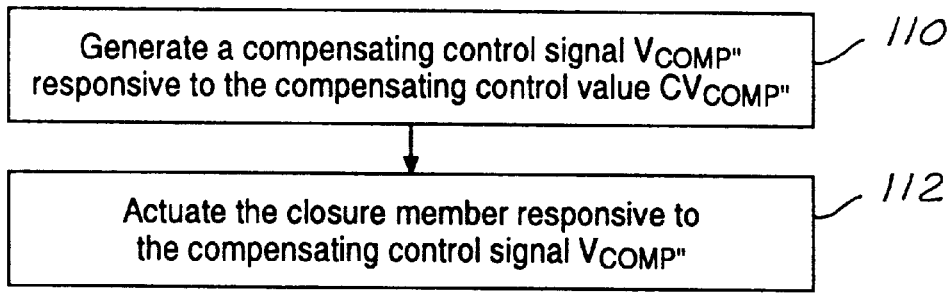

Referring to FIG. 6A, a method 102 for controlling a linearly actuated valve closure member 20 in accordance with a third embodiment of the present invention is illustrated. It should be understood, however, that the method 102 may be utilized with any conventional valve including a rotatably actuated valve such as a throttle valve. In particular, the method 102 compensates for coulombic friction associated with the member 20. The method 102 includes the step 32 of determining the control value C associated with the control signal $V_C$ indicative of an uncompensated target position of the member 20. The method 102 further includes the step 52 of calculating the coulombic friction compensation value CF associated with the member 20. The method 102 further includes a step 104 of calculating a compensating control value $CV_{COMP''}$ responsive to the control value C and the coulombic friction compensation value CF. Referring to FIG. 6B, the step 104 includes a substep 106 of adding the coulombic friction compensation value CF to the control value C to obtain the compensating control value $CV_{COMP''}$ ($CV_{COMP''}=C+CF$). Referring to FIG. 6A, the method 102 further includes a step 108 of actuating the member 20 responsive to the compensating control value $CV_{COMP''}$. Referring to FIG. 6C, the step 108 includes a substep 110 of generating a compensating control signal $V_{COMP''}$ responsive to the compensating control value $CV_{COMP''}$. The step 108 further includes a substep 112 of actuating the member 20 responsive to the compensating control signal $V_{COMP''}$.

The control system 10 and methods in accordance with the present invention represent a significant improvement over conventional systems and methods. In particular, the inventive control system and methods compensate for hysteresis caused by static friction and coulombic friction resulting in a relatively fast valve response. Further, the inventive control system 10 and methods compensate for hysteresis over the entire operational position range of a valve closure member. As a result, a relatively fast valve response is obtained over the entire operational position range of the valve closure member.

While the invention has been particularly shown and described with reference to the preferred embodiments thereof, it is well understood by those skilled in the art that various changes and modifications can be made in the invention without departing from the spirit and the scope of the invention.

We claim:

1. A method for controlling a valve closure member over the entire operational range of the closure member, comprising the steps of:

determining a control value indicative of an uncompensated target position of said closure member;

calculating a friction compensation value associated with said closure member;

calculating a compensating control value responsive to said control value and said friction compensation value; and, actuating said closure member responsive to said compensating control value.

2. The method of claim 1 wherein said control value is associated with a control signal and said friction compensation value is a static friction compensation value.

3. The method of claim 2 wherein the step of calculating a static friction compensation value includes the substeps of:

high pass filtering a position signal indicative of a position of said closure member to obtain a position value associated with high frequency components of said position signal;

calculating an absolute value of said position value;

comparing said absolute value of said position value to a movement calibration constant to determine whether said closure member is moving; and, determining said static friction compensation value responsive to whether said closure member is moving.

4. The method of claim 3 wherein the substep of determining said static friction compensation value when said closure member is moving, includes the substep of:

setting said static friction compensation value equal to zero.

5. The method of claim 3 wherein the substep of determining said static friction compensation value when said closure member is not moving, includes the substeps of:

high pass filtering said control signal to obtain a directional value associated with high frequency components of said control signal;

comparing said directional value to a first directional calibration constant to determine whether said control signal is directing said closure member to move in a first direction; and, determining said static friction compensation value responsive to whether said control signal is directing said closure member to move in said first direction.

6. The method of claim 5 wherein the substep of determining said static friction compensation value when said control signal is directing said closure member to move in said first direction, includes the substeps of:

setting said static friction compensation value equal to a first static friction calibration constant.

7. The method of claim 5 wherein the step of determining said static friction compensation value when said control signal is not directing said closure member to move in said first direction, includes the substeps of:
   comparing said directional value to a second directional calibration constant to determine whether said control signal is directing said closure member to move in a second direction; and,
   determining said static friction compensation value responsive to whether said control signal is directing said closure member to move in said second direction.

8. The method of claim 7 wherein the substep of determining said static friction compensation value when said control signal is directing said closure member to move in said second direction, includes the substep of:
   setting said static friction compensation value equal to a first static friction calibration constant.

9. The method of claim 7 wherein the substep of calculating said static friction compensation value when said control signal is not directing said closure member to move in said second direction, includes the substep of:
   setting said static friction compensation value equal to zero.

10. The method of claim 1 wherein said control value is associated with a control signal and said friction compensation value is a coulombic friction compensation value.

11. The method of claim 10 wherein the step of calculating said coulombic friction compensation value, includes the substeps of:
   high pass filtering said control signal to obtain a directional value associated with said high frequency components of said control signal;
   comparing said directional value to a first directional calibration constant to determine whether said control signal is directing said closure member to move in a first direction; and,
   determining said coulombic friction compensation value responsive to whether said control signal is directing said closure member to move in said first direction.

12. The method of claim 11 wherein the substep of determining said coulombic friction compensation value when said control signal is directing said closure member to move in said first direction, includes the substeps of:
   setting said coulombic friction compensation value equal to a first coulombic friction calibration constant.

13. The method of claim 11 wherein the substep of determining said coulombic friction compensation value when said control signal is not directing said closure member to move in said first direction, includes the substeps of:
   comparing said directional value to a second directional calibration constant to determine whether said control signal is directing said closure member to move in a second direction; and,
   determining said coulombic friction compensation value responsive to whether said control signal is directing said closure member to move in said second direction.

14. The method of claim 13 wherein the substep of determining said coulombic friction compensation value when said control signal is directing said closure member to move in said second direction, includes the substep of:
   setting said coulombic friction compensation value equal to a first coulombic friction calibration constant.

15. The method of claim 13 wherein the substep of determining said coulombic friction compensation value when said control signal is not directing said closure member to move in said second direction, includes the substep of:
   setting said coulombic friction compensation value equal to zero.

16. The method of claim 1 wherein the step of calculating said compensating control value includes the substep of:
   adding said friction compensation value to said control value to obtain said compensating control value.

17. The method of claim 1 wherein the step of actuating said closure member, includes the substeps of:
   generating a compensating control signal responsive to said compensating control value; and,
   actuating said closure member responsive to said compensating control signal.

18. A method for controlling a linearly actuated valve closure member, comprising the steps of:
   determining a control value associated with a control signal indicative of an uncompensated target position of said closure member;
   calculating a static friction compensation value associated with said closure member;
   calculating a coulombic friction compensation value associated with said closure member;
   calculating a compensating control value responsive to said control value and said static friction compensation value and said coulombic friction compensation value; and,
   actuating said closure member responsive to said compensating control value.

19. The method of claim 18 wherein the step of calculating a static friction compensation value includes the substeps of:
   high pass filtering a position signal indicative of a position of said closure member to obtain a position value associated with high frequency components of said position signal;
   calculating an absolute value of said position value;
   comparing said absolute value of said position value to a movement calibration constant to determine whether said closure member is moving; and,
   determining said static friction compensation value responsive to whether said closure member is moving.

20. The method of claim 18 wherein the step of calculating said coulombic friction compensation value, includes the substeps of:
   high pass filtering said control signal to obtain a directional value associated with said high frequency components of said control signal;
   comparing said directional value to a first directional calibration constant to determine whether said control signal is directing said closure member to move in a first direction; and,
   determining said coulombic friction compensation value responsive to whether said control signal is directing said closure member to move in said first direction.

21. A control system for controlling a linearly actuated valve closure member, comprising:
   an actuator that variably controls a position of said closure member; and,
   a controller configured to determine a control value indicative of an uncompensated target position of said closure member, said controller being further configured to calculate a friction compensation value associated with said closure member; said controller being further configured to calculate a compensating control value responsive to said control value and said friction compensation value; and, said controller being further configured to actuate said closure member responsive to said compensating control value utilizing said actuator.

22. The control system of claim 21 further comprising a position sensor that generates a position signal indicative of said position of said closure member wherein said friction compensation value is a static friction compensation value calculated responsive to said position signal.

23. The control system of claim 21 wherein said friction compensation value is a coulombic friction compensation value.

24. A control system for controlling a linearly actuated valve closure member, comprising:

an actuator that variably controls a position of said closure member;

a position sensor that generates a position signal indicative of said position of said closure member; and, a controller configured to obtain a control value indicative of an uncompensated target position of said closure member, said controller being further configured to calculate a static friction compensation value associated with said closure member responsive to said position signal; said controller being further configured to calculate a coulombic friction compensation value associated with said closure member; said controller being further configured to calculate a compensating control value responsive to said control value and said static friction compensation value and said coulombic friction compensation value; and, said controller being further configured to actuate said closure member responsive to said compensating control value utilizing said actuator.

* * * * *